US006838617B2

(12) United States Patent
Shaw et al.

(10) Patent No.: US 6,838,617 B2
(45) Date of Patent: Jan. 4, 2005

(54) MACROENCAPSULATION CONTAINER HAVING BOTH RELEASABLE AND PERMANENT SEALING MEANS

(75) Inventors: Mark D. Shaw, Ponte Vedra Beach, FL (US); J. Tad Heyman, Atlantic Beach, FL (US); Laurence M. Bierce, Macclenny, FL (US)

(73) Assignee: UltraTech International, Inc., Jacksonville, FL (US)

( * ) Notice: Subject to any disclaimer, the term of this patent is extended or adjusted under 35 U.S.C. 154(b) by 0 days.

(21) Appl. No.: 10/427,835

(22) Filed: May 1, 2003

(65) Prior Publication Data

US 2004/0217553 A1 Nov. 4, 2004

(51) Int. Cl.[7] .................................................. H02G 3/08
(52) U.S. Cl. ........................ 174/50; 174/17 CT; 174/66; 174/50.5; 174/17 R; 156/69; 156/273.9
(58) Field of Search ..................... 174/50, 17 R, 174/17 CT, 17.05, 50.5, 50.52, 66, 50.51; 156/69, 273.9, 274.2, 306.6; 264/248; 220/3.2, 3.3, 3.8, 4.02, 23.9, 908, 495.01, 359.4; 361/600, 601, 602, 603

(56) References Cited

U.S. PATENT DOCUMENTS

| 2,744,655 A | 5/1956 | Vnuk |
| 3,095,112 A | 6/1963 | Weinstein et al. |
| 3,133,846 A | 5/1964 | Gandy |
| 3,348,640 A | 10/1967 | Thompson et al. |
| 3,506,519 A | 4/1970 | Blumenkranz |
| 3,561,982 A | 2/1971 | Oeth |
| 3,599,134 A | * 8/1971 | Galloway .................... 336/230 |
| 4,201,306 A | 5/1980 | Dubois et al. |
| 4,436,988 A | 3/1984 | Blumenkranz |
| 4,586,624 A | 5/1986 | Shaw |
| 4,588,088 A | * 5/1986 | Allen .......................... 206/525 |
| 4,712,711 A | * 12/1987 | Geering et al. ........... 220/254.2 |
| 4,743,320 A | 5/1988 | Shaw |
| 4,781,304 A | 11/1988 | Lapeyre |
| 5,137,166 A | 8/1992 | Unger et al. |
| 5,407,514 A | 4/1995 | Butts et al. |
| 5,407,520 A | 4/1995 | Butts et al. |
| 5,968,442 A | 10/1999 | Sato et al. |
| 5,972,275 A | 10/1999 | Phelps et al. |
| 6,299,950 B1 | * 10/2001 | Byington et al. .......... 428/34.5 |
| 6,343,458 B1 | * 2/2002 | Merrell ........................ 53/400 |
| 6,395,215 B1 | 5/2002 | Distelhoff et al. |
| 6,453,626 B1 | 9/2002 | Wellein et al. |
| 6,455,768 B2 | * 9/2002 | Negishi .................. 174/17 CT |
| 6,609,628 B2 | * 8/2003 | Tattam .................. 220/592.26 |

* cited by examiner

Primary Examiner—Dean A. Reichard
Assistant Examiner—Angel R. Estrada
(74) Attorney, Agent, or Firm—Thomas C. Saitta

(57) ABSTRACT

A macroencapsulation container having in combination an inner container member with an inner lid member and an inner body member, and an outer container member with an outer lid member and an outer body member, the inner container member being composed of a thermoplastic polymer material that can be thermo-welded or thermo-bonded to itself by melting. The outer container is composed of a metal. At least one electric resistance wire is embedded in or mounted onto the inner lid member along the area of contact with the inner body member, such that the inner lid member may be thermo-bonded to the inner body member to create an integral, one-piece inner container member encapsulating any material or containers disposed within.

52 Claims, 4 Drawing Sheets

MACROENCAPSULATION CONTAINER HAVING BOTH RELEASABLE AND PERMANENT SEALING MEANS

BACKGROUND OF THE INVENTION

This invention relates generally to the field of sealable containers comprising a main body with a removable lid member, including both primary and secondary containers, wherein the container is provided with means to temporarily and releasably seal the lid member to the main body, such that the lid member can be removed and replaced for access to the interior of the container, and is further provided with means to permanently seal the lid member to the main body by thermo-bonding, such that the lid member and main body become an integral unit. More particularly, the invention relates to such containers comprising an inner body member and inner lid member composed of a thermoplastic polymer material and an outer body member and outer lid member composed of a metal.

There are circumstances where it is desirable to store materials within a container of a type such that the container can be opened and resealed once or multiple times, and later permanently sealed such that the container lid cannot be removed from the container body without destruction of the lid or body. One field where this is particularly desirable is the field of hazardous and/or radioactive waste storage and disposal. Hundreds of millions of tons of hazardous and/or radioactive waste materials are generated each year, such as solid waste in bulk or particulate form, sludge, stabilized waste, medical waste, and radioactive waste. For collection, storage, transport and disposal of such hazardous and/or radioactive wastes, it is common to utilize drums or box containers, made of plastic or metal dependent on the nature of the hazardous and/or radioactive material, where the hazardous material is either placed directly into the containers, such that the containers are designated as primary containers, or the waste is disposed within drums or boxes, and the drums or boxes themselves are then placed within the containers, such that the containers are designated as secondary containers.

One approach to addressing the need for temporary sealing followed by permanent sealing of the container is to provide a container whereby the lid of the container is temporarily secured to the main body of the container by mechanical fastener means, such as a releasable annular drum clamp, with the lid later permanently bonded in some manner to the body of the container to form an integral unit, such that the interior of the container cannot be accessed except by cutting or destroying the container. A container of this type is described for example in U.S. Pat. Nos. 4,586,624 and 4,743,320, the disclosures of which are incorporated herein by reference, wherein a lid made of thermoplastic material is thermo-welded or thermo-bonded to a container made of thermoplastic material by melting the contacting portions of the lid and container.

There are numerous regulations and standards relative to acceptable containers for the transport and storage of different types of hazardous and/or radioactive waste. Macroencapsulation is currently available at facilities permitted by the U.S. Environmental Protection Agency (EPA) for the treatment of radioactively contaminated hazardous waste. Macroencapsulation as specified by the EPA is designed to isolate hazardous waste from the disposal environment. The macroencapsulation process uses inert or non-reactive materials to achieve this isolation. The EPA began developing treatment standards for hazardous wastes in the late 1980's. The EPA developed these treatment standards based on the best demonstrated available technology for broad categories of waste. By 1992, the EPA realized that wastes such as debris were not amenable to the treatment standards established for process wastes. At that time the EPA promulgated alternative treatment standards for debris. They provided several options, one of which was macroencapsulation. The EPA had previously established macroencapsulation as the treatment standard for radioactively contaminated lead solids. The EPA defines macroencapsulation as the application of surface coating materials such as polymeric organics (e.g., resins and plastics) or use of jacket of inert inorganic materials to substantially reduce surface exposure to potential leaching media. The EPA went on to describe a performance standard for macroencapsulation of debris. This performance standard requires that the encapsulating material must completely encapsulate debris and be resistant to degradation by the debris and its contaminants and materials into which it may come into contact after placement (leachate, other waste, microbes).

Certain disposal sites require that the contents of containers brought to the site be verified on site, and the sites will not accept permanently sealed containers of hazardous and/or radioactive waste. In some instances, containers formed of solely of polymeric material do not meet the DOT, NCR, disposal sites, state or UN requirements for a particular type of hazardous and/or radioactive waste. Thus in many instances it is necessary to provide containers or secondary containers that are temporarily sealable to allow visual inspection, and which can then be permanently sealed in some manner for storage.

It is an object of this invention to provide a container that addresses the problems set forth above and that is composed of an outer container formed of a metal in combination with an inner container formed of a thermoplastic material, where the container may be sealed on a temporary basis by releasable and reusable sealing means to allow access to the interior of the inner container, and further where at least the inner container may be permanently sealed by thermo-welding the thermoplastic lid onto the thermoplastic main body. It is a further object to provide such a container where the inner thermoplastic container is either a separable insert received within the outer container or is an insert or liner adhered to the outer container, and preferably where the thermoplastic body is a liner or insert adhered to the interior walls of the outer container body while the thermoplastic lid is separate from the outer container lid or where the inner thermoplastic lid is a liner or insert adhered to the interior of the outer metal lid and the thermoplastic body is a liner or insert adhered to the interior walls of the outer container body. It is a further object to provide such a container where the temporary sealing means is a mechanical interlocking structure, either incorporated into the structure of the container itself or provided as a separate member, and where the permanent sealing means is a thermo-welded bond created by selectively melting the contacting portions of the thermoplastic lid and body, and which preferably utilizes an electrically conductive resistance wire disposed adjacent or embedded in the contacting portion or portions of the thermoplastic lid and body, such that current passed through the wire produces localized heating through resistance effects sufficient to melt portions of the lid and body which upon cooling create an integral container.

SUMMARY OF THE INVENTION

The invention is in general a macroencapsulation container having releasable and permanent closure or sealing means. The container comprises in combination an inner container member and an outer container member. The inner container member is composed of a thermoplastic polymer material that can be thermo-welded or thermo-bonded to itself by melting. The outer container is composed of a metal. The inner container member comprises an inner lid member fitted to an inner body member. The outer container member comprises an outer lid member fitted to an outer body member. Releasable outer closure means are provided to join the outer lid member to the outer body member. Permanent sealing means are provided for joining the inner lid member to the inner body member, wherein the permanent sealing means preferably comprises at least one electric resistance wire embedded in or mounted onto the inner lid member along the area of contact with the inner body member, such that the inner lid member may be thermo-bonded to the inner body member to create an integral, one-piece inner container member encapsulating any material or containers disposed within. The resistance wire may also be embedded in the inner body member. Alternatively, the integral, one-piece container may be produced by spin-welding a thermoplastic lid onto the inner container member. Preferably, the inner body member is joined to the outer body member. Most preferably, the inner body member is a liner formed directly on the outer body member by spraying, molding or otherwise applying melted or uncured thermoplastic material directly onto the inner walls of the outer body member. Most preferably, the inner lid would be a separate member that is not attached to the underside of the outer lid member.

A macroencapsulation container device comprising in combination an outer body member and an outer lid member, both composed of metal; an inner body member and an inner lid member, both composed of a thermoplastic material; outer closure means for releasably joining said outer lid member to said outer body member; and permanent sealing means for joining said inner lid member to said inner body member by thermo-bonding said inner lid member to said inner body member such that said inner lid member and said outer body member in combination form an integral inner container member.

A macroencapsulation container device comprising in combination an outer body member and an outer lid member, both composed of metal; an inner body member and an inner lid member, both composed of a thermoplastic material; outer closure means for releasably joining said outer lid member to said outer body member; and permanent sealing means for joining said inner lid member to said inner body member such that said inner lid member and said outer body member in combination form an integral inner container member.

A macroencapsulation container device comprising in combination a body member and a lid member, both composed of a thermoplastic material; closure means for releasably joining said lid member to said body member, and permanent sealing means for joining said lid member to said body member by thermo-bonding said lid member to said body member such that said lid member and said body member in combination form an integral container member, wherein said permanent sealing means comprises grooves and ridges disposed on said lid member and said body member and at least one electrical resistance wire disposed within said grooves, whereby said at least one electrical resistance wire generates sufficient heat upon application of an electric current such that said lid member and said body member undergo localized melting such that said lid member is permanently joined to said body member upon cooling.

A macroencapsulation container device comprising in combination a body member and a lid member, both composed of a thermoplastic material; closure means for releasably joining said lid member to said body member; and permanent sealing means for joining said lid member to said body member by thermo-bonding said lid member to said body member such that said lid member and said body member in combination form an integral container member, wherein said permanent sealing means comprises at least one electrical resistance wire embedded within said lid member, whereby said at least one electrical resistance wire generates sufficient heat upon application of an electric current such that said lid member and said body member undergo localized melting such that said lid member is permanently joined to said body member upon cooling; and a removable gasket seal positioned on said body member.

DETAILED DESCRIPTION OF THE INVENTION

Figure 1:
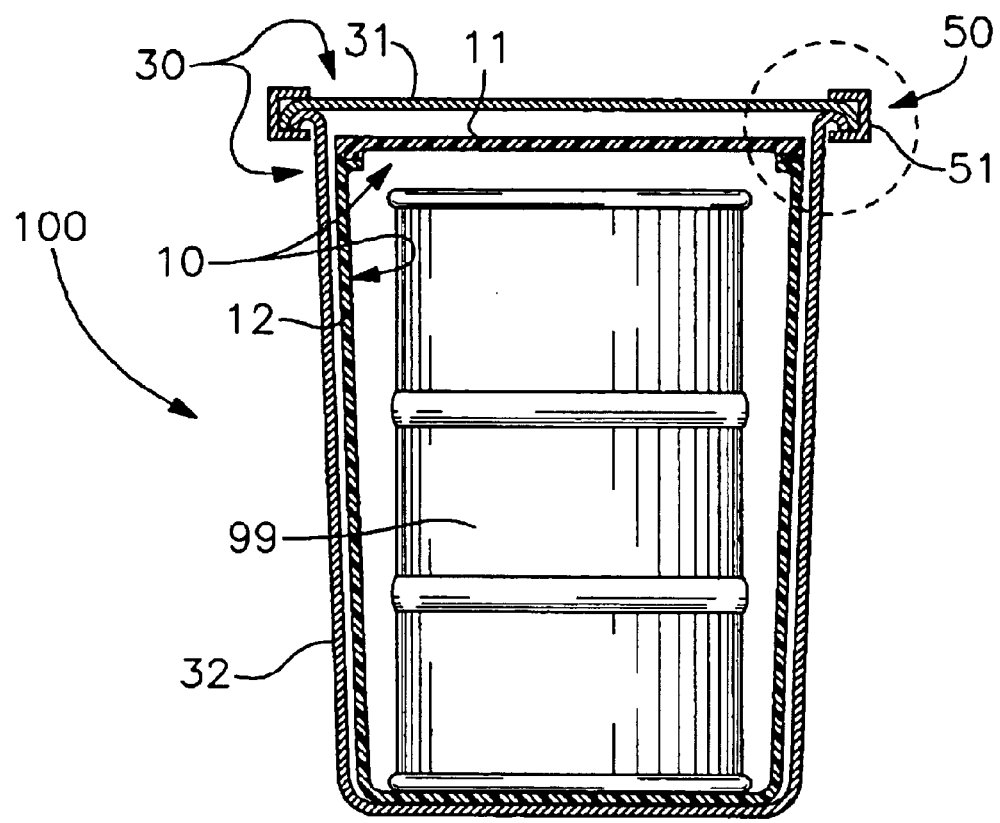
FIG. 1 is a cross-sectional view of the invention showing a combination container comprising an inner container member of thermoplastic material and an outer container member of metal, with a drum containing hazardous and/or radioactive waste retained therein.

With reference to the drawings, wherein like parts are designated by like reference numerals throughout, the invention will now be described in detail with regard for the best mode and the preferred embodiment. In general, the invention is a macroencapsulation container comprised of a thermoplastic inner container member and a metal outer container member, and having releasable closure means and permanent sealing means, such that the container can be opened and closed on a temporary basis multiple times, but wherein at least the inner container member can be permanently sealed by thermo-welding or thermo-bonding the inner lid member to the inner body member to form an integral, one-piece inner containment member. Preferably, the outer body member is joined to its corresponding outer body member, preferably as a formed-on or bonded liner, with the inner lid member not attached to the outer lid member.

As shown in FIG. 1, the encapsulation container device 100 is illustrated in a drum-shaped configuration having a circular lid and a circular-in-transverse-cross-section body, but it is to be understood that the macroencapsulation container 100 can be configured in the form of a box or any other shape having a lid and a body. The material 99 to be retained by the encapsulation container 100 is shown in FIG. 1 as contained within a drum-shaped container, which may be metal or plastic, but it is to be understood that the material 99 may be disposed directly into the macroencapsulation container 100 or retained within any other type or shape container, including but not limited to drums, cans, boxes, bags, etc. If the material 99 to be placed within the macroencapsulation container 100 has a high radioactive level, it is contemplated that shielding may need to be inserted to the interior of the inner container 10 with the radioactive material 99 placed inside the shielding.

The macroencapsulation container 100 comprises an inner container member 10 and an outer container member 30, with inner container member 10 sized to fit within outer container member 30. Inner container member 10 comprises the combination of an inner lid member 11 and an inner body member 12, where inner lid member 11 is sized and configured to define a closed interior when seated upon inner body member 12. Temporary closure means 60 comprising any suitable means for temporarily joining the inner lid member 11 to the inner body member 12 is provided, such as by a press-fit construction or mechanically interlocking members, shown for example in FIG. 2 as an annular lip 61 mated with an annular shoulder 62 or in FIG. 3 as an annular flange 63 mated with an annular groove 64. The temporary closure means 60 allows the inner lid member 11 to be removed and replaced as needed for access to the interior of the inner container member 10. The inner lid member 11 and the inner body member 12 of the inner container member 10 are composed of a thermoplastic polymer material that melts when raised above a certain temperature and then hardens back into a solid state upon cooling. For example, polyethylene is a suitable thermoplastic material for this purpose.

Figure 8:
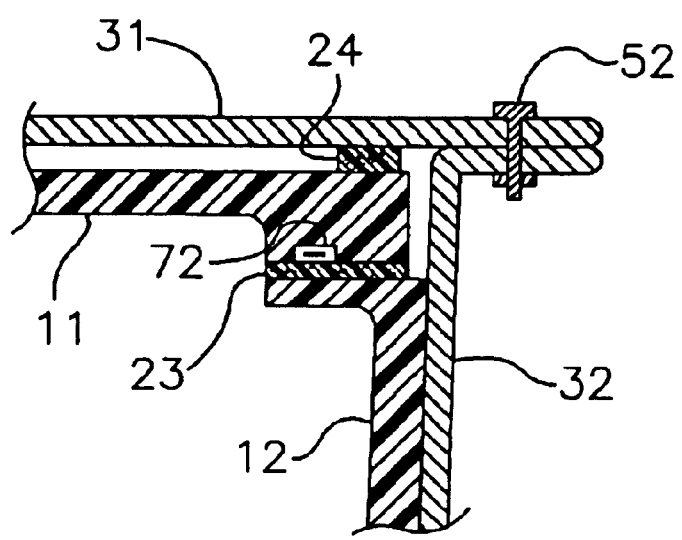
FIG. 8 shows an alternative embodiment incorporating a compressible seal between the outer lid member, and a compressible seal or cover strip disposed on the inner body member.

More preferably, the upper surface of the inner body member 12 is provided with a removable cover layer or compressible gasket seal 23, as shown in FIG. 8, which may be temporarily attached by a suitable adhesive or mechanical interlocking means that allows the gasket seal 23 to be removed when it is desired to permanently join the inner lid member 11 to the inner body member 12. This gasket seal 23 protects the upper surface of the inner body member from damage and from accumulation of foreign matter, either of which may affect the completeness of the permanent joining. Use of a compressible foam material or the like for gasket seal 23 is preferable, as this allows the compressive force of the inner lid member 11 to create a temporary seal between the inner lid member 11 and the inner body member 12. In addition, the invention may be configured such that a compression gasket 24 may be disposed between the outer lid member 31 and the inner lid member 11 whereby the weight of the outer lid member 31 forces the inner lid member 11 downward against the gasket seal 23.

Figure 2:
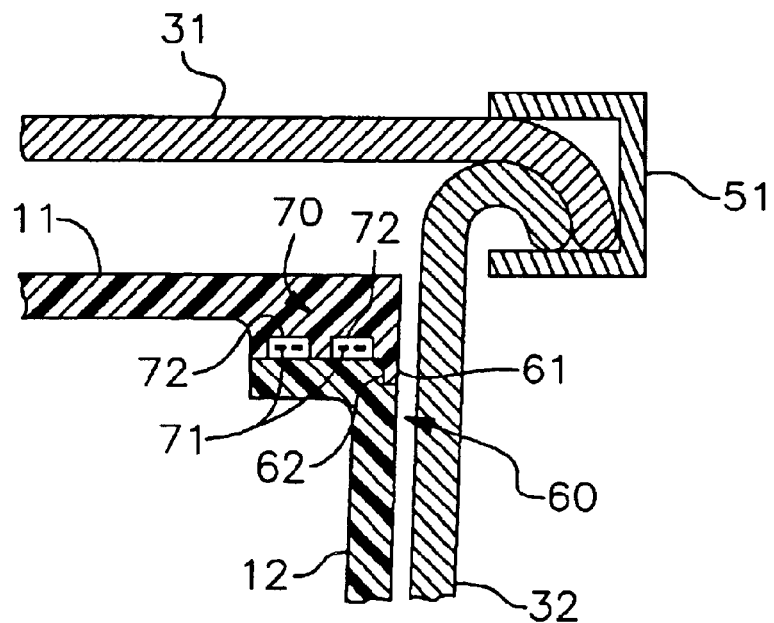
FIG. 2 is a cross-sectional view of the indicated portion of FIG. 1 showing the resistance wires embedded in the inner lid member.

The outer container member 30 comprises the combination of an outer lid member 31 and an outer body member 32, where outer lid member 31 is sized and configured to define a closed interior when seated upon outer body member 32. The outer lid member 31 and the outer body member 32 of the outer container member 30 are composed of a metal, such as steel for example. Releasable outer closure means 50 is provided to temporarily join the outer lid member 31 to the outer body member 32 in a manner such that the outer lid member 31 may be removed and replaced as required. Preferably, the outer closure means 50 comprises a type of mechanical fastener, such as for example an annular drum clamp 51 of known type as shown in FIGS. 1 and 2 that is adapted to receive a lock for securing the outer container member 30 from unauthorized entry, bolts 52 passing through flanges, as seen in FIG. 8, straps composed of steel or other suitable material, or any other suitable mechanical fastener construction.

Permanent sealing means 70 is provided for permanently joining at least the inner lid member 11 to the inner body member 12, whereby the inner lid member 11 is bonded or joined to the inner body member 12 in a manner that creates an integral, one-piece inner container member 10, such that entry or access into the integral inner container member 10 can only be obtained by destructive means, such as drilling, cutting, puncturing or the like. In the preferred manner, the inner lid member 11 is thermo-welded or thermo-bonded to the inner body member 12 by localized melting of the thermoplastic material in the areas of contact between the two components, such that the molten material from the two components melds and fuses upon cooling, the hardened material obliterating the joint such that the inner lid member 11 cannot be removed from the inner body member 12 without destroying the now integral inner container member 10 by cutting or other means. This thermo-bonding is most preferably performed by disposing one or more electric resistance wires 71, typically encased in a sheath or cover 72, at the junction between the inner lid member 11 and the inner body member 12. The wires 71 are preferably rectangular in cross-section to maximize heat dispersion and to minimize migration within the molten thermoplastic, and are connected to an electric current source in known manner such that upon application of a suitable predetermined current, the wires will heat up due to resistance effects to a temperature in excess of the melt temperature of the thermoplastic material forming the inner container member 10. Once sufficient melting has occurred to insure a continuous and strong seal between the inner lid member 11 and the inner body member 12, the current is turned off and the melted thermoplastic material is allowed to harden. Most preferably, the wires 71 are disposed on, mounted to or embedded within the underside of the inner lid member 11. A compressive force may also be applied during the melting and curing steps, such as by the use of a press or weighted elements, to insure a complete seal is formed between the inner lid member 11 and the inner body member 12. Alternatively, other techniques for joining the inner lid member 11 to the inner body member 12 may be utilized, such as by spinwelding or the use of suitable adhesives.

In this manner, a macroencapsulation container 100 is provided with a thermoplastic inner container member 10 and a metal outer container member 30 that are both accessible as needed, since the inner lid member 11 and the outer lid member 31 are releasably joined to the inner body member 12 and the outer body member 32, respectively. When access into the inner container member 10 is no longer needed, the inner container member 10 is permanently sealed by thermo-bonding the inner lid member 11 to the inner body member 12 to form an integral, one-piece inner container member 10 such that the waste material 99 is permanently encapsulated and access to the interior of the inner container member 10 is precluded absent destruction of the inner container member 10.

Figure 3:
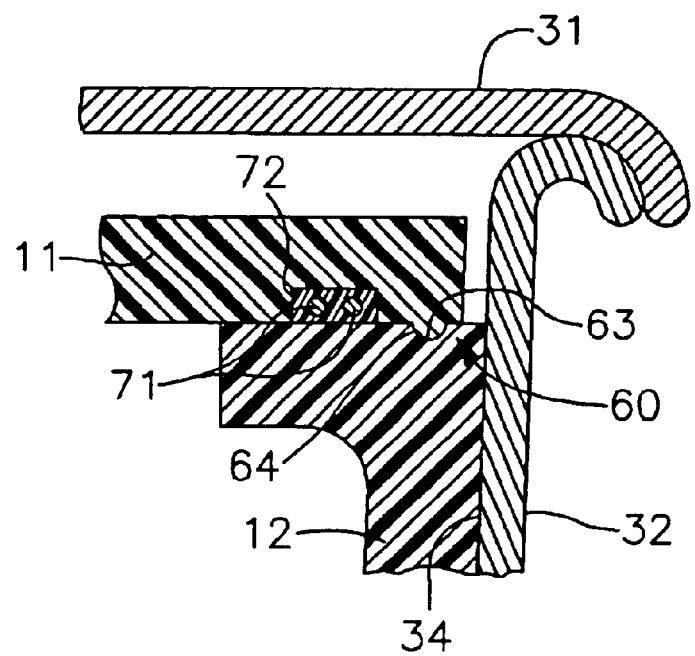
FIG. 3 is a cross-sectional view showing an alternative construction for the invention, where the inner body member is bonded to the outer body member.

In a more preferred embodiment, as shown in FIG. 3, the thermoplastic inner body member 12 is bonded or joined to the inner wall 34 of the metal outer body member 32. This may be accomplished by adhesive bonding or similar means, but most preferably the inner body member 12 is molded or formed directly on the outer body inner wall 34 as a layer by various known techniques, such as by spraying molten thermoplastic material onto the inner wall 34 which bonds upon cooling or roto-molding forming techniques where the outer body member 32 acts as a component of the mold, etc. In this way the inner body member 12 is a liner adhered to the inner wall 34 of the outer body member 32. In this embodiment, the inner lid member 11 and the outer lid member 32 are separate components.

Figure 4:
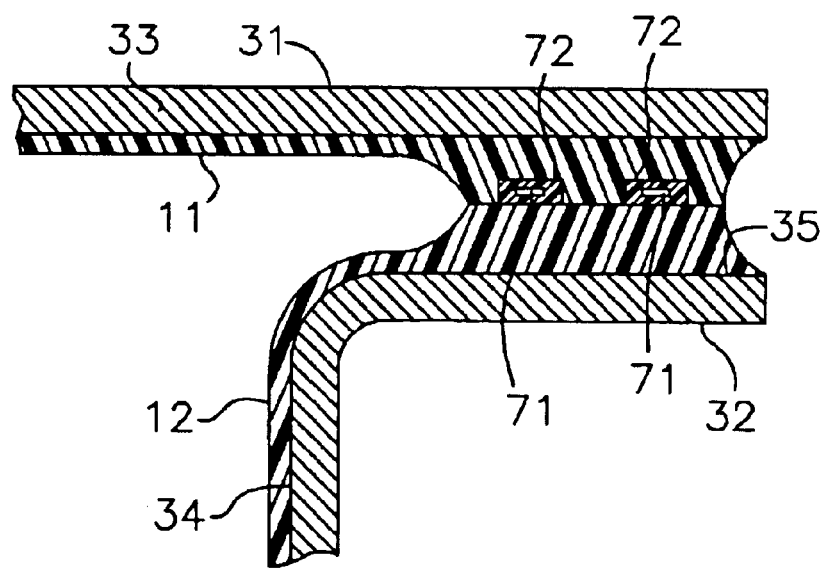
FIG. 4 is a cross-sectional view showing an alternative construction for the invention, where the inner lid member is bonded to the outer lid member and the inner body member is boned to the outer body member.

In an alternate embodiment shown in FIG. 4, the thermoplastic inner lid member 11 is bonded or joined to the inner wall 33 of the metal outer lid member 31. This may be accomplished by adhesive bonding or similar means, but most preferably the inner lid member 11 is molded or formed directly on the outer lid inner wall 33 as a layer by various known techniques, such as by spraying molten thermoplastic material onto the inner wall 33 which bonds upon cooling or roto-molding forming techniques where the outer lid member 31 acts as a component of the mold, etc. In this way the inner lid member 11 is a liner adhered to the inner wall 33 of the outer lid member 31. The thermoplastic inner body member 12 is bonded or joined to the inner wall 34 of the metal outer body member 32 as described above. In this embodiment, the releasable outer closure means 50 may be the inner closure means 60 as well, since it serves to temporarily join the inner lid member 11 to the inner body member 12 at the same time it temporarily joins the outer lid member 31 to the outer body member 32. In this configuration, it is preferred that the outer body member 32 be configured to present an upper flange surface 35 generally corresponding to the outer perimeter area of the inner wall 33 of the outer lid member 31, most preferably being parallel planes, such that a sufficiently wide and thick joint, preferably approximately 2 inches in width by one inch in combined height, is provided between the inner lid member 11 and the inner body member 12 to insure that a sufficient amount of thermoplastic material is present to form a secure seal upon thermo-bonding. The relatively thick joint area may be accomplished during molding, or may be provided as a strip of thermoplastic material boned or mechanically fastened to the outer lid member 31 and the outer body member 32. In this way, the thickness of the major interior portions of the inner liner member 11 and inner body member 12 can be reduced.

Figure 5:
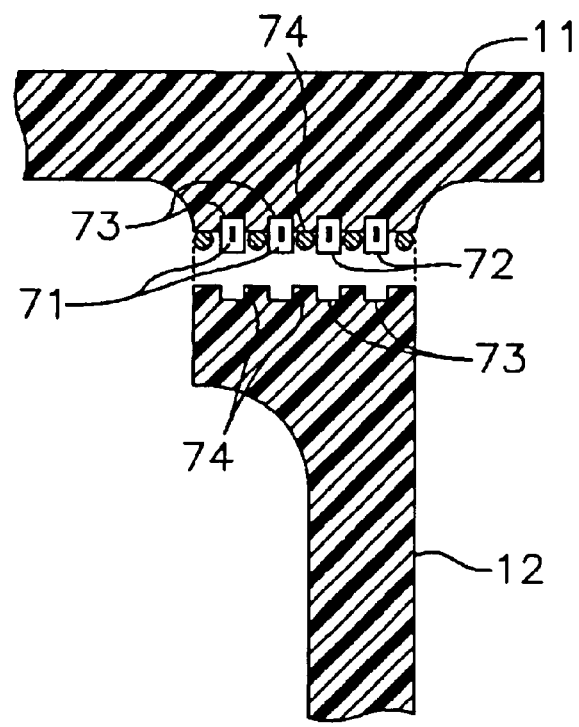
FIG. 5 shows an alternative embodiment for the permanent sealing means for thermo-bonding the inner lid member to the inner body member.

FIG. 5 shows an alternative embodiment for the permanent sealing means 70 for thermo-bonding the inner lid member 11 to the inner body member 12. As shown, the upper surface of the inner body member 12 is provided with a plurality of grooves 73 and ridges 74. Grooves 73 and ridges 74 are also correspondingly disposed on the lower surface of the inner lid member 11, and the resistance wires 71 and sheaths 72 are preferably positioned within the grooves on the inner lid member 11. The grooves 73 and ridges 74 limit migration of the wires 71 and sheaths 72 when the thermoplastic is melted, and the ridges 74 provide thin areas of material for faster and more complete melting. Filler rods 74 of a thermoplastic material with various cross-sectional shapes may be provided between and beside the sheaths 72. The filler rods 74 may be composed of the same or a different polymer than that of the inner containment member 10. By way of example, all measurement approximate, the sheaths 72 may be rectangular with dimensions of 3/16 inches by 1/4 inches in order to fit within grooves 73 having a width of 3/16 inches and a height of 1/16 inches, separated by ridges with a width of 5/32 inches and a height of 1/16 inches. Edges and corners are preferably chamfered or radiused to reduce stress fracture effects.

Figure 6:
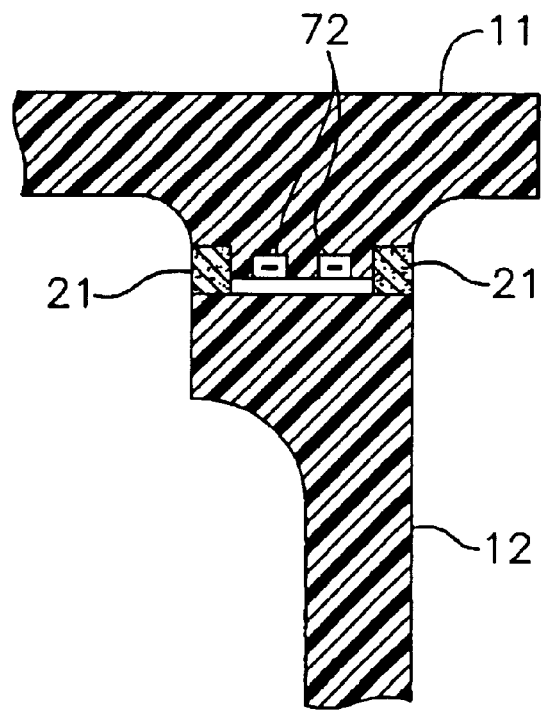
FIG. 6 shows an alternative embodiment for the permanent sealing means wherein a pair of compressible gaskets are provided to act as dams to control the melt flow of the thermoplastic material during thermo-bonding.

FIG. 6 illustrates another alternate embodiment for the inner container member 10, wherein a pair of compressible gasket members 21, composed of a polymer foam material, are provided that act as dams to control the flow of the molten thermoplastic during thermo-bonding of the inner lid member 11 to the outer body member 12.

Figure 7:
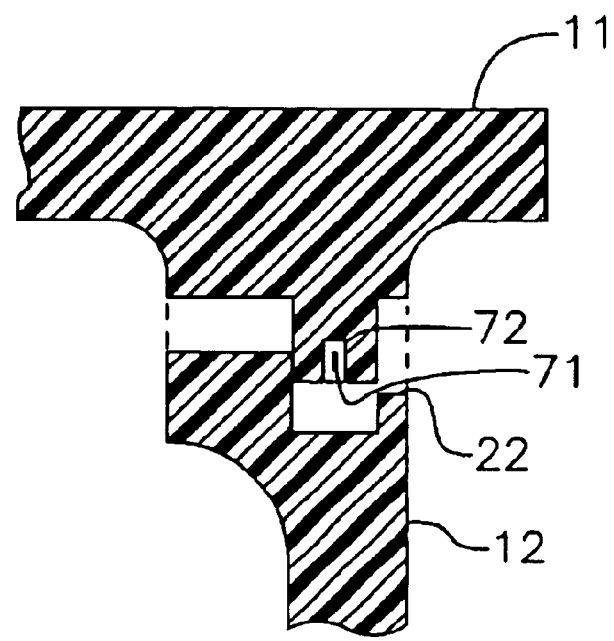
FIG. 7 shows an alternative embodiment for the permanent sealing means wherein an exterior gap is provided between the inner lid member and the inner body member such that a visible bead of melted thermoplastic can be viewed within the gap.

FIG. 7 illustrates another alternate embodiment for the inner container member 10, wherein a seal indicator gap 22 is provided on the upper rim of the inner body member 12, such that the gap 22 provides a visible window about the entire perimeter of the inner body member 12 and below the inner lid member 11, even after the inner lid member 11 has been thermo-bonded to the inner body member 12. The resistance wires 71 are embedded within a depending flange 13 on the inner lid member 11. The volume of thermoplastic material present in the depending flange 13 is greater than the channel 36 formed in the inner body member 12, such that a bead of melted and re-hardened thermoplastic is visible within or through the gap 22 after thermo-bonding, thus providing visible indication of a complete seal around the entire perimeter.

In another embodiment, the thermoplastic comprising portions of the inner lid member 11 and the inner body member 12 may be of the same color while the thermoplastic sheath 72 around the sealing wires would be made of a different color. For example, the thermoplastic of the inner lid member 11 and the inner body member 12 may be whitish or translucent, while the thermoplastic sheath around the sealing wires would be a black color. The contrast in colors provides a readily visible indicator to verify the completeness of the seal formed when the inner lid member 11 is permanently bonded to the inner body member 12.

Whereas certain aspects of the means and mechanisms for sealing the inner container member 10 are novel and non-obvious improvements for known means of permanently sealing thermoplastic encapsulation devices regardless of the presence of the an outer container member 30, and it is to be understood that the macroencapsulation container 100 may comprise the thermoplastic inner container member 10 alone under certain conditions for the transport and storage of hazardous waste materials 99, such that inner lid member 11 is merely a lid member and inner body member 12 is merely a body member, and releasable outer closure means 50 is merely outer closure means.

It is contemplated that equivalents and substitutions for certain elements and components set forth above by way of disclosure may be obvious to those skilled in the art, and thus the true scope and definition of the invention is to be as set forth in the following claims.

We claim:

1. A macroencapsulation container device comprising in combination:

an outer body member and an outer lid member, both composed of metal;

an inner body member and an inner lid member, both composed of a thermoplastic material, wherein said inner body member is joined to the inner wall of said outer body member;

outer closure means for releasably joining said outer lid member to said outer body member; and permanent sealing means for joining said inner lid member to said inner body member by thermo-bonding said inner lid member to said inner body member such that said inner lid member and said inner body member in combination form an integral inner container member;

wherein said permanent sealing means comprises at least one electrical resistance wire embedded within said inner lid member, whereby said at least one electrical resistance wire generates sufficient heat upon application of an electric current such that said inner lid member and said inner body member undergo localized melting such that said inner lid member is permanently joined to said inner body member upon cooling.

2. The device of claim 1, wherein said inner body member comprises a liner formed directly on said inner wall of said outer body member.

3. The device of claim 1, wherein said outer closure means comprises a mechanical fastener.

4. The device of claim 1, wherein said outer closure means comprises an annular drum clamp.

5. The device of claim 1, further comprising inner closure means for releasably joining said inner lid member to said inner body member.

6. The device of claim 1, further comprising compressible gasket members disposed on said inner body member.

7. The device of claim 1, wherein said resistance wire is encased within a thermoplastic sheath, and wherein said inner lid member and said inner body member are a different color than said thermoplastic sheath, whereby the completeness of the thermo-bonding of said inner lid and body members and said thermoplastic sheath is visually verifiable.

8. The device of claim 1, further comprising a removable gasket seal positioned on said inner body member, wherein said removable gasket must be removed to enable said inner lid member to be permanently joined to said inner body member.

9. The device of claim 8, wherein said removable gasket seal is formed of a compressible material.

10. The device of claim 9, further comprising a compressible gasket positioned between said outer lid member and said inner lid member.

11. A macroencapsulation container device comprising in combination:
an outer body member and an outer lid member, both composed of metal;
an inner body member and an inner lid member, both composed of a thermoplastic material, wherein said inner lid member is joined to the inner wall of said outer lid member;
outer closure means for releasably joining said outer lid member to said outer body member; and
permanent sealing means for joining said inner lid member to said inner body member by thermo-bonding said inner lid member to said inner body member such that said inner lid member and said inner body member in combination form an integral inner container member;
wherein said permanent sealing means comprises at least one electrical resistance wire embedded within said inner lid member, whereby said at least one electrical resistance wire generates sufficient heat upon application of an electric current such that said inner lid member and said inner body member undergo localized melting such that said inner lid member is permanently joined to said inner body member upon cooling.

12. The device of claim 11, wherein said inner lid member comprises a liner formed directly on said inner wall of said outer lid member.

13. The device of claim 11, wherein said outer closure means comprises a mechanical fastener.

14. The device of claim 11, wherein said outer closure means comprises an annular drum clamp.

15. The device of claim 11, further comprising inner closure means for releasably joining said inner lid member to said inner body member.

16. The device of claim 11, further comprising compressible gasket members disposed on said inner body member.

17. The device of claim 11, wherein said resistance wire is encased within a thermoplastic sheath, and wherein said inner lid member and said inner body member are a different color than said thermoplastic sheath, whereby the completeness of the thermo-bonding of said inner lid and body members and said thermoplastic sheath is visually verifiable.

18. The device of claim 11, further comprising a removable gasket seal positioned on said inner body member, wherein said removable gasket must be removed to enable said inner lid member to be permanently joined to said inner body member.

19. The device of claim 18, wherein said removable gasket seal is formed of a compressible material.

20. The device of claim 19, further comprising a compressible gasket positioned between said outer lid member and said inner lid member.

21. A macroencapsulation container device comprising in combination:
an outer body member and an outer lid member, both composed of metal;
an inner body member and an inner lid member, both composed of a thermoplastic material:
outer closure means for releasably joining said outer lid member to said outer body member; and
permanent sealing means for joining said inner lid member to said inner body member by thermo-bonding said inner lid member to said inner body member such that said inner lid member and said inner body member in combination form an integral inner container member;
wherein said permanent sealing means comprises at least one electrical resistance wire embedded within said inner lid member, whereby said at least one electrical resistance wire generates sufficient heat upon application of an electric current such that said inner lid member and said inner body member undergo localized melting such that said inner lid member is permanently joined to said inner body member upon cooling; and
further comprising grooves and ridges disposed on said inner lid member and said inner body member, wherein said at least one resistance wires are disposed within said grooves.

22. The device of claim 21, further comprising filler rods composed of a thermoplastic material, said filler rods being disposed beside said resistance wires.

23. A macroencapsulation container device comprising in combination:
an outer body member and an outer lid member, both composed of metal;
an inner body member and an inner lid member, both composed of a thermoplastic material;
outer closure means for releasably joining said outer lid member to said outer body member; and
permanent sealing means for joining said inner lid member to said inner body member by thermo-bonding said inner lid member to said inner body member such that said inner lid member and said inner body member in combination form an integral inner container member;
wherein said permanent sealing means comprises at least one electrical resistance wire embedded within said inner lid member, whereby said at least one electrical resistance wire generates sufficient heat upon application of an electric current such that said inner lid member and said inner body member undergo localized melting such that said inner lid member is permanently joined to said inner body member upon cooling; and further comprising a seal indicator gap disposed between said inner lid member and said inner body member, whereby a bead of melted and rehardened thermoplastic material is visible within said gap after said inner lid member is permanently bonded to said inner body member.

24. A macroencapsulation container device comprising in combination:

an outer body member and an outer lid member, both composed of metal;

an inner body member and an inner lid member, both composed of a thermoplastic material, wherein said inner body member is joined to the inner wall of said outer body member;

outer closure means for releasably joining said outer lid member to said outer body member; and permanent sealing means for joining said inner lid member to said inner body member such that said inner lid member and said inner body member in combination form an integral inner container member.

25. The device of claim 24, wherein said inner body member comprises a liner formed directly on said inner wall of said outer body member.

26. The device of claim 24, wherein said outer closure means comprises a mechanical fastener.

27. The device of claim 24, wherein said outer closure means comprises an annular drum clamp.

28. The device of claim 24, further comprising inner closure means for releasably joining said inner lid member to said inner body member.

29. The device of claim 24, further comprising compressible gasket members disposed on said inner body member.

30. The device of claim 24, further comprising a seal indicator gap disposed between said inner lid member and said inner body member, whereby a bead of melted and rehardened thermoplastic material is visible within said gap after said inner lid member is permanently bonded to said inner body member.

31. The device of claim 24, further comprising a removable gasket seal positioned on said inner body member, wherein said removable gasket must be removed to enable said inner lid member to be permanently joined to said inner body member.

32. The device of claim 31, wherein said removable gasket seal is formed of a compressible material.

33. The device of claim 32, further comprising a compressible gasket positioned between said outer lid member and said inner lid member.

34. The device of claim 24, wherein said permanent sealing means is a spinwelded joint.

35. The device of claim 24, wherein said permanent sealing means is an adhesively bonded joint.

36. A macroencapsulation container device comprising in combination:

an outer body member and an outer lid member, both composed of metal;

an inner body member and an inner lid member, both composed of a thermoplastic material, wherein said inner lid member is joined to the inner wall of said outer lid member;

outer closure means for releasably joining said outer lid member to said outer body member; and permanent sealing means for joining said inner lid member to said inner body member such that said inner lid member and said inner body member in combination form an integral inner container member.

37. The device of claim 36, wherein said inner lid member comprises a liner formed directly on said inner wall of said outer lid member.

38. The device of claim 36, wherein said outer closure means comprises a mechanical fastener.

39. The device of claim 36, wherein said outer closure means comprises an annular drum clamp.

40. The device of claim 36, further comprising inner closure means for releasably joining said inner lid member to said inner body member.

41. The device of claim 36, further comprising compressible gasket members disposed on said inner body member.

42. The device of claim 36, further comprising an electrical resistance wire encased thermoplastic sheath, and wherein said inner lid member and said inner body member are a different color than said thermoplastic sheath, whereby the completeness of the thermo-bonding of said inner lid and body members and said thermoplastic sheath is visually verifiable.

43. The device of claim 36, further comprising a removable gasket seal positioned on said inner body member, wherein said removable gasket must be removed to enable said inner lid member to be permanently joined to said inner body member.

44. The device of claim 43, wherein said removable gasket seal is formed of a compressible material.

45. The device of claim 44, further comprising a compressible gasket positioned between said outer lid member and said inner lid member.

46. A macroencapsulation container device comprising in combination:

a body member and a lid member, both composed of a thermoplastic material;

closure means for releasably joining said lid member to said body member; and permanent sealing means for joining said lid member to said body member by thermo-bonding said lid member to said body member such that said lid member and said body member in combination form an integral container member, wherein said permanent sealing means comprises grooves and ridges disposed on said lid member and said body member and at least one electrical resistance wire disposed within said grooves, whereby said at least one electrical resistance wire generates sufficient heat upon application of an electric current such that said lid member and said body member undergo localized melting such that said lid member is permanently joined to said body member upon cooling.

47. The device of claim 46, further comprising filler rods composed of a thermoplastic material, said filler rods being disposed beside said resistance wires.

48. The device of claim 36, further comprising compressible gasket members disposed on said body member.

49. The device of claim 46, further comprising a seal indicator gap disposed between said lid member and said body member, whereby a bead of melted and rehardened thermoplastic material is visible within said gap after said lid member is permanently bonded to said body member.

50. The device of claim 46, wherein said resistance wire is encased within a thermoplastic sheath, and wherein said lid member and said body member are a different color than said thermoplastic sheath, whereby the completeness of the thermo-bonding of said lid and body members and said thermoplastic sheath is visually verifiable.

51. The device of claim 46, further comprising a removable gasket seal positioned on said body member, wherein said removable gasket must be removed to enable said lid member to be permanently joined to said body member.

52. The device of claim 51, wherein said removable gasket seal is formed of a compressible material.

* * * * *